F. R. BICKHART.
BATTERY GRID.
APPLICATION FILED DEC. 1, 1919.

1,343,957.

Patented June 22, 1920.
2 SHEETS—SHEET 1.

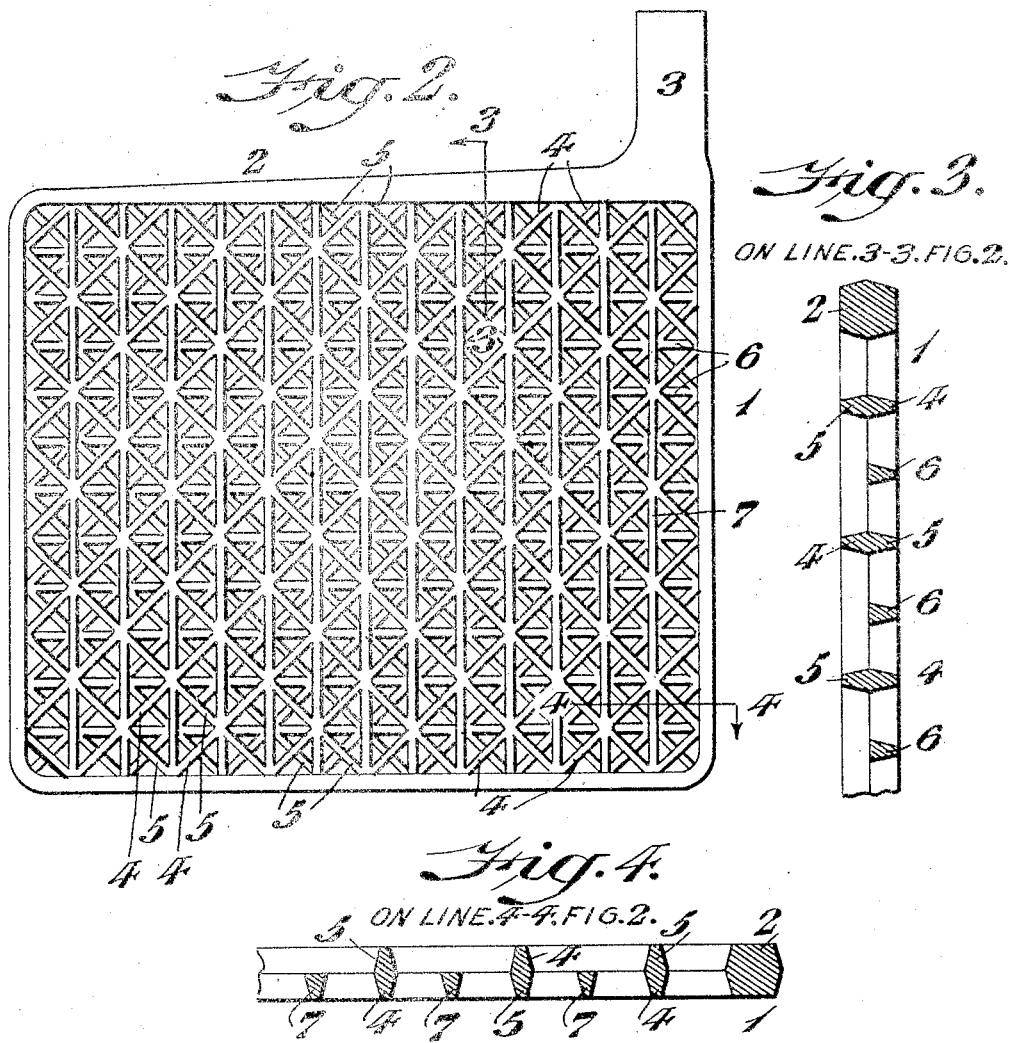

UNITED STATES PATENT OFFICE.

FRANKLIN R. BICKHART, OF PHILADELPHIA, PENNSYLVANIA, ASSIGNOR TO
ARTHUR H. LYONS, OF PHILADELPHIA, PENNSYLVANIA.

BATTERY-GRID.

1,343,957.  Specification of Letters Patent. Patented June 22, 1920.

Application filed December 1, 1919. Serial No. 341,663.

*To all whom it may concern:*

Be it known that I, FRANKLIN R. BICKHART, a citizen of the United States, residing at Philadelphia, county of Philadelphia, State of Pennsylvania, have invented a new and useful Battery-Grid, of which the following is a specification.

My present invention relates to a novel construction of a battery grid for secondary or storage batteries and more particularly to the type of storage batteries which are employed on motor vehicles wherein they are subjected to excessive vibration. It is essential in a battery of this type that the grid which forms the support for the active material contains the maximum amount of metal in order to secure the highest efficiency within the cell and also that the grid be constructed in such a manner that the active material will be securely held in place and any warping or buckling of the battery plates prevented. There is a tendency in a device of this type, when discharging, of the active material to shrink and draw away from the grid thereby causing a high internal resistance.

With the above in view my invention comprehends a novel construction of a battery grid in which the strains are evenly distributed throughout the entire grid.

It further comprehends a novel construction of a battery grid wherein the grid is formed by a series of triangles the apices of which on one side of the grid are presented in a different direction from the apices of the triangles on the opposite side of the grid.

It further comprehends a novel construction of a battery grid wherein the grid portion forms a series of quadrangles having diagonal brace or tie ribs which on one side of the grid extend in a vertical direction and on the opposite side of the grid in a lateral or a horizontal direction, so that the entire structure is completely trussed and the strain to which it is subjected is evenly distributed throughout the grid thus enabling it to more efficiently perform the function required of it.

Other novel features of construction and advantage will hereinafter more clearly appear in the detailed description of the invention.

For the purpose of illustrating my invention, I have shown in the accompanying drawings a typical embodiment of it which is at present preferred by me, since said embodiment will give in practice satisfactory and reliable results, although it is to be understood that the various instrumentalities of which my invention consists can be variously arranged and organized and that my invention is not limited to the precise arrangement and organization of these instrumentalities as herein shown and described.

Fig. 2 represents, in side elevation, the battery grid viewed from the opposite side from which Fig. 1 is viewed.

Fig. 3 represents a section on line 3—3 of Fig. 2.

Fig. 4 represents a section on line 4—4 of Fig. 2.

Similar numerals of reference indicate corresponding parts.

Figure 1:
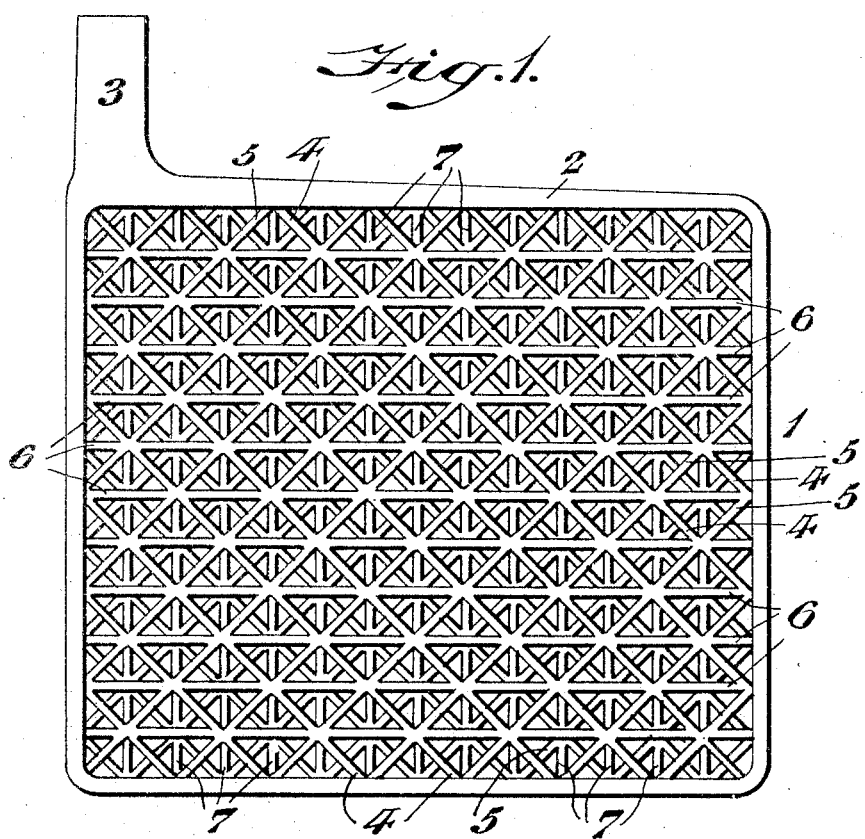
Figure 1 represents, in side elevation, a battery grid, embodying my invention.

Referring to the drawings, 1 designates a battery grid embodying my invention. The grid is provided with a rectangular inclosing frame 2 from which extends the binding post 3. The body portion of the grid is formed with ribs 4 and 5 extending diagonally across the body portion and disposed at substantially right angles to each other and forming a series of rectangles. The body portion is trussed on one side by ribs 6 which pass through opposite angles of a row of rectangles and extend laterally in substantially a horizontal direction, as seen in Fig. 1. The opposite side of the body portion is trussed by ribs 7 which extend in a vertical direction through opposite angles of a vertical row of rectangles. The ribs 6 and 7 preferably converge outwardly from the center of the grid. It will thus be seen that the grid may be described as consisting of a series of rows of triangles which on one side of the grid have their apices presented in a vertical direction and on the opposite side in a lateral direction. The grid may be formed as a unitary structure by casting and the construction is such that an excellent casting can be produced.

The active material may be readily molded under the proper degree of compression within the openings, thereby bringing it into the requisite relation with the metal supporting ribs.

The top rib of the frame 2, as will be clearly understood by reference to Figs. 1 and 2, preferably tapers toward the binding post 3, in order to provide a large conducting surface at the end of the plate through which the current must flow, the result of which is that all parts of the plate will be affected in the same manner and the tendency of the current to become concentrated at or near the base of the post with consequent injury to the plate at this point is eliminated.

It will now be apparent that I have devised a novel and useful battery grid which embodies the features of advantage enumerated as desirable in the statement of the invention and the above description, and while I have, in the present instance, shown and described a preferred embodiment thereof which will give in practice satisfactory and reliable results, it is to be understood that such embodiment is susceptible of modification in various particulars without departing from the spirit or scope of the invention or sacrificing any of its advantages.

Having thus described my invention, what I claim as new and desire to secure by Letters Patent, is:—

1. A grid for secondary batteries comprising a frame, opposite sets of spaced parallel ribs arranged at substantially right angles to each other, and opposite sets of spaced parallel ribs angularly arranged with relation to the first named ribs and diagonally arranged with relation to said frame.

2. A grid for secondary batteries comprising a frame, opposite sets of spaced parallel ribs arranged at substantially right angles to each other and parallel to the respective sides of said frame, and opposite sets of spaced parallel ribs angularly arranged with relation to the first named ribs and diagonally arranged with relation to said frame.

3. A grid for secondary batteries comprising a frame, and opposite sets of spaced parallel ribs, said ribs forming opposite sets of rectangles, the rectangles of one set being arranged in staggered relation to those of the opposite set.

4. A grid for secondary batteries comprising a frame, opposite sets of spaced parallel ribs arranged diagonally of said frame and forming opposite sets of rectangles, and other opposite sets of spaced parallel ribs, each of said last named ribs extending through opposite corners of a row of rectangles and thus forming rows of triangles.

5. A grid for secondary batteries comprising a frame, opposite sets of spaced parallel ribs arranged diagonally of said frame and forming opposite sets of rectangles, the rectangles of one set being arranged in staggered relation to those of the opposite set, and other opposite sets of spaced parallel ribs, each of said last named ribs extending through opposite corners of a row of the rectangles and thus forming rows of triangles.

FRANKLIN R. BICKHART.

Witnesses:
H. S. FAIRBANKS,
H. G. MITCHELL.